US005795936A

United States Patent [19]
Lin et al.

[11] Patent Number: 5,795,936
[45] Date of Patent: Aug. 18, 1998

[54] STYRENIC RESIN COMPOSITION

[75] Inventors: Chuan-Ming Lin, Tainan Hsien; Dong-Bi Shiueh, Tainan, both of Taiwan

[73] Assignee: Chi Mei Corporation, Tainan Hsien, Taiwan

[21] Appl. No.: 690,452

[22] Filed: Jun. 27, 1996

[51] Int. Cl.$^6$ .................... C08L 55/02; C08L 51/04
[52] U.S. Cl. .................... 525/71; 525/85; 525/316
[58] Field of Search .................... 525/71, 85, 316, 525/73

[56] References Cited

U.S. PATENT DOCUMENTS

| | | | |
|---|---|---|---|
| 5,270,387 | 12/1993 | Shields et al. | 525/71 |
| 5,605,963 | 2/1997 | Leitz et al. | 525/71 |
| 5,610,235 | 3/1997 | Hiromoto et al. | 525/71 |

FOREIGN PATENT DOCUMENTS

| | | |
|---|---|---|
| 1921112 | 4/1969 | Germany . |
| 43-7551 | 3/1968 | Japan . |
| 0184244 | 10/1984 | Japan . |

*Primary Examiner*—Irina S. Zemel
*Attorney, Agent, or Firm*—Ladas & Parry

[57] ABSTRACT

A styrenic resin composition includes:

(1) 5 to 90 weight percent of a graft copolymer (C) prepared by bulk or solution polymerization of 100 parts by weight of monomers including 80 to 45 parts by weight of vinyl aromatic monomers, 15 to 50 parts by weight of vinyl cyanide monomers, and 0 to 40 parts by weight of copolymerizable monomers, in the presence of 0.1 to 10 parts by weight of a rubber graft copolymer (A) having a weight average particle size of 0.05 to 0.8 μm and 0.1 to 10 parts by weight of an acrylic copolymer (B);

(2) 95 to 10 weight percent of a graft copolymer (D) prepared by emulsion polymerization of 50 to 15 parts by weight of a mixture of 45 to 80 parts by weight of vinyl aromatic monomers, 15 to 50 parts by weight of vinyl cyanide monomers and, optionally, 0 to 40 parts by weight of copolymerizable monomers, in the presence of 50 to 85 parts by weight of a butadiene rubber having a weight average particle size of 0.05 to 0.8 μm; and (3) 0 to 80 weight percent of a copolymer (E) prepared by polymerization of 80 to 50 parts by weight of vinyl aromatic monomers, 20 to 50 parts by weight of vinyl cyanide monomers and, optionally, 0 to 40 parts by weight of copolymerizable monomers.

3 Claims, No Drawings

STYRENIC RESIN COMPOSITION

BACKGROUND OF THE INVENTION

1. Field of the Invention

This invention relates to a styrenic resin composition, particularly to a styrenic resin composition which has good impact strength, small gloss variance and excellent metalplating characteristics.

2. Description of the Related Art

Styrenic resins (such as an ABS resin) characterized by their good molding processibilities, physical and mechanical properties are generally used in office affair appliances, electronic and automobiles products. However, there is a need for better impact strength and better gloss of ABS resin. Specifically, there is a problem of gloss variance of the molded article. That is, the gloss levels at different sites of the molded article or the gloss levels with different viewing directions at the same site of the molded article are variant. Thus, the appearance of the final product would be deteriously affected.

On the other hand, since the ABS resin is characterized by its ease of molding, light weight and ability to undergo metalplating, it has gradually taken the place of metals and has been developed for use in automobile parts and other decorative, corrosion resistant products. The metalplating is achieved by chemically etching the surface of the ABS molding with a strong oxidizing agent which attacks the rubber particles and leaves etch pits in the surface of the moulding and is followed by senitisation, activation and electroless metal deposition step. The electroless metal deposition step is achieved by dipping the product in a chemical electroplating solution so that a layer of metal is deposited on the surface and the aforementioned etch pits of the ABS moulding. By means of the anchor effect of the etch pits, the deposited layer of metal can firmly adhere to the surface of the ABS resin.

However, there are two main shortcomings encountered in metal-plated ABS mouldings.

(1) In metal-plated plastic products, undesirable "blistering" is frequently observed between the surface of the plastic substrate and the metallic film plated thereon. This is because the difference between the plastic substrate and the metallic film in coefficient of linear expansion is so great that they are forced to separate each other due to the change of environmental conditions, particularly the change of temperature. The characteristics of plastics, plastic products or plated plastic products relating to such blistering is called "heat cycle property".

(2) In plated resin articles, however, the plating layer is really peeled from the resin surface according to changes of the ambient temperature because the difference of the linear expansion coefficient between the metal phase and the resin phase is very great, and even in ABS resin, it has been desired to improve the adhesion strength of the plating layer.

In order to improve the above deficiencies, it has been suggested to adjust the injection conditions of the ABS resin, that is, to raise the injection temperature and to reduce the injection rate and injection pressure. By means of this method, the adhesion strength of the metal plated layer is slightly improved. However, the improvement achieved thereby is limited, and raising of the injection temperature causes thermal deterioration of the resin. Further, a reduction in the injection rate and injection pressure will decrease the rate of production and thus, is not economical. Therefore, the metalplating properties of metal-plated styrenic resins cannot be effectively improved merely by the adjusting of the injection conditions thereof.

SUMMARY OF THE INVENTION

It is therefore the main objective of this invention to provide a styrenic resin composition which has high impact strength, small gloss variance and excellent metalplating characteristics.

The styrenic resin composition of this invention comprises:

(1) 5 to 90 weight percent of a graft copolymer (C) prepared by bulk or solution polymerization of 100 parts by weight of monomers including 80 to 45 parts by weight of vinyl aromatic monomers, 15 to 50 parts by weight of vinyl cyanide monomers, and 0 to 40 parts by weight of copolymerizable monomers, in the presence of 0.1 to 10 parts by weight of a rubber graft copolymer (A) having a weight average particle size of 0.05 to 0.8 μm and 0.1 to 10 parts by weight of an acrylic copolymer (B), wherein, the acrylic copolymer (B) is prepared from 10 to 100 wt % of at least one monomer selected from (meth)acrylate monomers and acrylonitrile monomer, 0 to 80 wt % of vinyl aromatic monomers and 0 to 30 wt % of copolymerizable monomers;

(2) 95 to 10 weight percent of a graft copolymer (D) prepared by emulsion polymerization of 50 to 15 parts by weight of a mixture of 45 to 80 parts by weight of vinyl aromatic monomers, 15 to 50 parts by weight of vinyl cyanide monomers and, optionally, 0 to 40 parts by weight of copolymerizable monomers, in the presence of 50 to 85 parts by weight of a butadienic rubber having a weight average particle size of 0.05 to 0.8 μm; and (3) 0 to 80 weight percent of a copolymer (E) prepared by polymerization of 80 to 50 parts by weight of vinyl aromatic monomers, 20 to 50 parts by weight of vinyl cyanide monomers and, optionally, 0 to 40 parts by weight of copolymerizable monomers.

DETAILED DESCRIPTION OF THE PREFERRED EMBODIMENT

The rubber graft copolymer (A) used in this invention is prepared by the graft polymerization of 50 to 15 parts by weight of a mixture of monomers including 45 to 80 parts by weight of vinyl aromatic monomers, 15 to 50 parts by weight of vinyl cyanide monomers and 0 to 40 parts by weight of other copolymerizable monomers, in the presence of 50 to 85 parts by weight of butadienic rubber latex, to form a latex of rubber graft copolymer (A) having a weight average particle size of 0.05 to 0.8 μm. The latex is then coagulated, dehydrated, and dried to produce the rubber graft copolymer (A) in a powdery or particulate form.

The butadienic rubber latex is a homopolymer or copolymer prepared by 100 to 60 weight percent of butadiene monomer and 0 to 40 weight percent of copolymerizable unsaturated monomers. Examples of the copolymerizable unsaturated monomers are vinyl aromatic monomers, vinyl cyanide monomers and esters of (meth)acrylic acid. Examples of the butadienic rubber latex are polybutadiene, butadiene-styrene copolymer, butadiene-acrylonitrile copolymer, and butadiene-methyl methacrylate copolymer. The above monomers can be polymerized directly to form a butadienic rubber latex having a weight average particle size of 0.05 to 0.8 μm. Alternatively, a rubber latex virgin with a particle size of 0.05 to 0.18 μm may be prepared firstly, which is then agglomerated to have a particle size of 0.2 to 0.8 μm by a conventional rubber agglomerating method. Examples of the rubber agglomerating method include a chemical agglomerating method, a mechanical stirring agglomerating method, and a freezing agglomerating method. The chemical agglomerating method is achieved by adding an organic acid, a metal salt or a carboxylic acid group-containing polymeric agglomerating agent into the butadienic rubber latex virgin. One of the polymeric agglomerating agent used in the chemical agglomerating method is a butyl acrylate-methacrylic acid copolymer.

The graft copolymer (A) is prepared by a conventional graft polymerization of a mixture of monomers in the presence of a butadienic rubber latex. The mixture of vinyl aromatic monomers, vinyl cyanide monomers and, optionally, (meth)acrylate monomers is polymerized by graft polymerization so that some of the polymeric chain of the former monomers is grafted on or chemically bonded to the butadienic rubber. By adjusting the weight ratio of the monomers to the butadienic rubber and the polymerization conditions thereof, a polymer with a desired degree of grafting can be obtained. The degree of grafting is also affected by the polymerization conditions, the chemical structures of the butadiene rubber latex, the rubbery particle size, the rate of the addition of the monomers, and the amount and species of the chain transfer agent and emulsifying agent used in the graft polymerization.

The amount of the initiator added to the graft polymerization is generally in the range of 0.01 to 5.0 parts by weight based on 100 parts by weight of the monomers, preferably 0.1 to 3.0 parts by weight, depending on the species of monomers and the degree of polymerization. Generally, the monomers and initiators may be added at one time or may be added continuously or incrementally. The initiators may be any of the conventional initiators used for the emulsion polymerization, for example, a peroxide, a diazo compound or a persulfate compound. Oil-soluble peroxide initiators suitable for the graft polymerization include dicumyl peroxide, t-butyl peroxide and cumene hydroperoxide.

The molecular weight of the grafted polymeric chain of the rubber graft copolymer (A) can be controlled by adjusting the temperature of the graft polymerization or by addition of chain transfer agents, such as mercaptan, halogen or terpene compounds. Examples of the chain transfer agents are n-dodecyl mercaptan, tert-dodecyl mercaptan, carbon tetrabromide, terpinolene and 2,4-diphenyl-4-methyl-1-pentene.

The graft polymerization is carried out at a temperature between 20° to 100° C. and a pressure between 0 to 100 P.S.I.G under inert atmosphere with stirring. The polymerization time takes 2 to 10 hours, preferably 4 to 8 hours for more than 90% of monomers to be polymerized.

Examples of the vinyl aromatic monomers used in this invention are styrene, a-methyl styrene, α-chloro styrene, p-tert-butyl styrene, p-methyl styrene, o-chlorostyrene, p-chlorostyrene, 2,5-dichlorostyrene, 3,4-dichlorostyrene, 2,4,6-trichlorostyrene, 2,5-dibromostyrene and divinyl benzene. Styrene and α-methyl styrene are preferred.

Examples of the vinyl cyanide monomers are acrylonitrile, methacrylonitrile. Acrylonitrile is preferred.

Examples of the copolymerizable monomers used for preparing the rubber graft copolymer (A) are (meth)acrylate monomers, maleimide-based monomers, acrylic acid and maleic anhydride. Examples of the (meth)acrylate monomers are methyl (meth)acrylate, ethyl (meth)acrylate, propyl (meth)acrylate, butyl (meth)acrylate, benzyl (meth)acrylate, hexyl (meth)acrylate, cyclohexyl (meth)acrylate, dodecyl (meth)acrylate, 2-hydroxyethyl (meth)acrylate, glycidyi (meth)acrylate, γ-methacryl dipropyl trimethoxysilane, dimethylaminoethyl methacrylate and ethylene glycol methacrylate. Methyl methacrylate is preferred.

Examples of maleimide-based monomers are maleimide, N-methyl maleimide, N-isopropyl maleimide, N-butyl maleimide, N-hexyl maleimide, N-octyl maleimide, N-dodecyl maleimide, N-cyclohexyl maleimide, N-phenyl maleimide, N-2,3-dimethylphenyl maleimide, N-2,4-dimethylphenyl maleimide, N-2,3-diethylphenyl maleimide, N-2,4-diethylphenyl maleimide, N-2,3-dibutylphenyl maleimide, N-2,4-dibutylphenyl maleimide, N-2,6-dimethylphenyl maleimide, N-2,3-dichlorophenyl maleimide, N-2,4-dichlorophenyl maleimide, N-2,3-dibromophenyl maleimide, and N-2,4-dibromophenyl maleimide. N-phenyl maleimide is preferred.

By means of the above graft polymerization, a latex of rubber graft copolymer (A) having a weight average particle size of 0.05 to 0.8 μm, preferably 0.06 to 0.4 μm, can be produced. When the average particle size thereof is less than 0.05 μm, the impact strength of the resin and the adhesion strength of the metal-plated layer will not be significantly improved, and the tensile strength of the resin and the gloss variance of the molded article will also be poor.

A suitable coagulating agent should be added into the above latex of rubber graft copolymer (A) to coagulate the latter. Examples of the coagulating agent which are generally used include acids such as sulfuric acid and acetic acid, and alkaline earth metal salts, for example, calcium salts such as calcium chloride, magnesium salts such as magnesium chloride, magnesium sulfate and aluminium salts such as aluminium sulfate. Alkaline earth metal salts are preferred. The coagulated polymer slurry of rubber graft copolymer (A) is then dehydrated and dried and appeared in the form of dry powder or particulate which would be desired in the preparation of graft copolymer (C).

The so-called degree of grafting of rubber graft copolymer (A) is the weight ratio of the grafted rigid copolymer to the rubber. Here the grafted rigid copolymer means the polymeric chains of the grafting monomers which are chemically bonded to the rubber. The molecular weight of the grafted rigid copolymer is preferably in the range of 40,000 to 120,000, and the degree of grafting thereof is 10 to 40%, thereby, a metal-plated article having good impact strength and good adhesion strength of the metal layer and good appearance can be obtained.

The acrylic copolymer (B) for use in preparing the graft copolymer (C) in this invention comprises 10 to 100 weight percent of at least one monomer selected from (meth) acrylate monomers and acrylonitrile monomer, 0 to 80 weight percent of vinyl aromatic monomers and 0 to 30 weight percent of other copolymerizable monomers. Examples of the acrylic copolymer (B) are styrene-acrylonitrile copolymer, methyl methacrylate-styrene-acrylonitrile copolymer, poly methyl methacrylate and styrene-methyl methacrylate copolymer. The polymerization may be a solution polymerization, a bulk polymerization, an emulsion polymerization or a suspension polymerization.

Examples of the vinyl aromatic monomers and (meth) acrylate monomer used for preparing the acrylic copolymer (B) are the same as those described in the rubber graft copolymer (A) and are not to be further explained hereinafter. Examples of the optional copolymerizable monomers are acrylic acid, maleic anhydride, ethylene glycol methacrylate, and maleimide-based monomers.

The graft copolymer (C) of the present invention are prepared from 0.1 to 10 parts by weight (based on 100 parts by weight of monomers) of rubber graft copolymer (A), 0.1 to 10 parts by weight (based on 100 parts by weight of monomers) of acrylic copolymer (B) and 100 parts by weight of monomers including 80 to 45 parts by weight of vinyl aromatic monomers, 15 to 50 parts by weight of vinyl cyanide monomers and 0 to 40 parts by weight of copolymerizable monomers, by means of a bulk or solution polymerization process. When the conversion reaches 40 to 90 weight percent, the copolymer solution is devolatilized for the removal of the unreacted monomers and volatile components and to produce the graft copolymer (C).

The polymerization of the graft copolymer (C) can be accomplished by a continuous bulk or solution polymerization reactor. Examples of such reactor include plug flow reactors, continuous stirring tank reactors (CSTR), and tubular reactors having a static mixer. The CSTR is preferred. There may be only one reactor or more reactors for the polymerization. During the preparation of the graft copolymer (C) of this invention, a polymerization initiator may be added into the reaction. The initiator may be selected from acyl peroxide, ester peroxide, ketal peroxide, peroxycarbonate and diazo-compound having nitrile group and cyclohexyl group. The amount of the initiator is 0.01 to 1.0 weight percent based on 100 weight percent of monomers.

The temperature of the polymerization is controlled in the range of 80° to 200° C., preferably 90° to 160° C. The pressure of the polymerization is controlled at 1 to 5 kg/cm². The retention time of the raw materials in the reactor is preferably in the range of 1 to 5 hours. To control the molecular weight of the polymer, a chain transfer agent such as tert-dodecyl mercaptan, n-dodecyl mercaptan, 2,4-diphenyl-4-methyl-1-pentene and terpinolene can be used.

After the polymerization is completed, the resulting copolymer solution is heated by a preheater to a high temperature and then devolatilized to remove unreacted monomers and volatile components. Generally, the devolatilization may be carried out by a reduced-pressure degassing means, or extruder degassing means to remove the volatile elements, which vapor is then recovered by a condenser. The recovered liquid is dehydrated to remove the moisture contained therein for reuse as feed solution. The polymer melt of the graft copolymer (C) which has been devolatilized is extruded and pelletized.

The amount of rubber graft copolymer (A) for use in preparing the graft copolymer (C) is in the range of 0.1 to 10 parts by weight, preferably in the range of 0.5 to 8 parts by weight, based on 100 parts by weight of monomers. If the amount of graft copolymer (A) is less than 0.1 part by weight, the impact strength would be inefficient, the gloss variance would be larger and the adhesion strength of the metal-plated layer and the heat cycle property would be poor. If the amount of the rubber graft copolymer (A) is greater than 10 parts by weight, the dispersion of the rubber graft copolymer (A) in the resin composition is poor, and surface deficiencies, such as fish eye, would be found on the appearance of both of the molded product and the metal-plated product.

The amount of the acrylic copolymer (B) used for preparing the graft copolymer (C) is in the range of 0.1 to 10 parts by weight, preferably 0.15 to 8 parts by weight, based on 100 parts by weight of monomers. When the amount of the acrylic copolymer (B) is less than 0.1 parts by weight, the rubber graft copolymer (A) is easily agglomerated and cannot be uniformly dispersed in the feed solution, thereby resulting in difficulty in transportation by the pump. Further, the graft copolymer (C) produced in the former condition would contain large rubbery particles and the resulted molded product/metal-plated product would show surface deficiencies, such as fish eye. The improvements in the gloss variance, and the adhesion strength of the metal-plated product are limited. If the amount of the acrylic polymer (B) is greater than 10 parts by weight, it is not economical for large amounts of acrylic polymer (B) to be repeatedly polymerized and processed. The content of the graft copolymer (C) in the resin composition of the present invention is in the range of 5 to 90 wt %.

Examples of the vinyl aromatic monomers and vinyl cyanide monomers used for preparing the graft copolymer (D) are the same as those described in the rubber graft copolymer (A). When the copolymerizable monomers are maleimide-based monomers, such as N-phenyl maleimide, a resin composition having excellent heat-resistant property can be obtained.

The manufacture of the graft copolymer (D) is similar to that of the graft copolymer (A). The graft copolymer (D) and the rubber graft copolymer (A) may be of the same composition or of different compositions. From the viewpoint of improving impact strength and adhesion strength of metal-plated layer, the degree of grafting of the graft copolymer (D) is preferably between 18 to 80% and the molecular weight of the grafted rigid copolymer is preferably between 40,000 to 200,000.

The weight average particle size of the rubber particle of the graft copolymer (D) is in the range of 0.05 to 0.8 μm, preferably 0.15 to 0.5 μm. When the weight average particle size is less than 0.05 μm, it is not possible to obtain a resin with high impact strength and high adhesion strength of the metal-plated product. When the weight average particle size is greater than 0.8 μm, the tensile strength and the impact strength would be poor. The content of the graft copolymer (D) in the resin composition of the present invention is in the range of 95 to 10 wt %.

The copolymer (E) is prepared by the polymerization of 80 to 50 parts by weight of vinyl aromatic monomers, 20 to 50 parts by weight of vinyl cyanide monomers and, optionally, 0 to 40 parts by weight of copolymerizable monomers. Examples of the vinyl aromatic monomers, vinyl cyanide monomers and copolymerizable monomers are the same as those described in the rubber graft copolymer (A). The copolymer (E) may be prepared by bulk, solution, suspension or emulsion polymerization. Bulk or solution polymerization is preferred. The molecular weight of the copolymer (E) is in the range of 60,000 to 400,000, preferably in the range of 80,000 to 300,000. The content of the copolymer (E) in the resin composition of this invention is 0 to 80 weight percent.

The resin compositions are produced by mixing and extruding the graft copolymer (C), the graft copolymer (D) and the copolymer (E) and the content of graft copolymer (C) is 5 to 90 weight percent based on the total resin composition, preferably 10 to 80 weight percent. When the content of the graft copolymer (C) is less than 5 weight percent, the impact strength and the gloss variance are not significantly improved. When the content of the graft copolymer (C) is greater than 90 weight percent, the impact strength is poor. The content of the graft copolymer (D) is 95 to 10 weight percent based on the total resin composition, preferably 60 to 15 weight percent. When the content of the graft copolymer (D) is over 95 weight percent, the processibility of the resin composition is poor and the appearance of the metal-plated product is not good due to the presence of excess rubber. If the content of the graft copolymer (D) is less than 10 weight percent, the impact strength of the resin composition and the adhesion strength of the metal-plated product will be poor.

Optionally, a phenolic or thio-propanoate anti-oxidant, a light stabilizer or an UV absorber may be added to the resin composition of this invention to produce a resin composition with predetermined characteristics. Other additives can be suitably added to improve the molding properties of the styrenic resin composition. Examples of such additives are plasticizers, fillers, coloring agents, lubricants, and antistatics.

A representative mixing process to produce the resin composition of the present invention includes dry-blending with a Henschel mixer, which is generally used in various fields of synthetic resin, then melt-mixing via an extruder, a mixer, a kneader or a Banbury blender.

The resin composition of the present invention can be used for injection molding, blow molding, compression molding or extrusion with plating or without plating. Examples of the extrusion products are sheets, films, pipes and profiles.

In addition, the styrenic resin composition of the present invention can be blended with the other resins, which is obtained as a polymer alloy. Examples of such type of resin are shown in Table 1. The resin compositions of the present invention are blended with such resins in a ratio of 90/10 to 20/80.

TABLE 1

| a | a resin prepared by dissolving a styrene soluble butadienic rubber in a mixture of styrene and acrylonitrile, and grafting a styrene-acrylonitrile copolymer on the butadienic rubber by a bulk or solution polymerization process (the weight average particle size of the butadienic rubber is 0.1 to 10 μm and the content of the butadienic rubber is 4 to 25 weight percent) |
| b | polycarbonate |
| c | polybutylene terphthalate, polyethylene terephthalate, polyamide 6 and polyamide 66 |
| d | polymethyl methacrylate |
| e | polyvinyl chloride |

The present invention is more specifically described and explained by means of the following Examples and physical properties tests, in which all parts and % are by weight of the total composition unless otherwise noted. It is to be understood that the present invention is not limited to these Examples.

PREPARATION EXAMPLE I-1

Preparation of the Rubber Graft Copolymer (A-1)

| components | weight parts |
|---|---|
| 1,3-butadiene | 150.00 |
| potassium persulfate solution (1%) | 15.00 |
| potassium oleate | 2.00 |
| distilled water | 190.00 |
| ethylene glycol methacrylate | 0.13 |

The above components are reacted at 65° C. for 12 hours to yield a butadienic rubber latex with a conversion of 94% and having a solid content of 40% and a weight average particle size of 0.1 μm.

A carboxylic acid group-containing polymeric agglomerating agent was prepared from the following components:

| components | weight parts |
|---|---|
| ethyl acrylate | 92.0 |
| methacrylic acid | 8.0 |
| potassium persulfate solution (1%) | 0.5 |
| sodium dodecyl sulfate solution (10%) | 0.5 |
| n-dodecyl mercaptan | 1.0 |
| distilled water | 200.0 |

The above components are reacted at 75° C. for 5 hours to yield a carboxylic acid group-containing polymeric agglomerating agent with a conversion of 95% and a pH value of 6.2.

100 parts (dry weight) of the butadiene rubber latex are then agglomerated with 3.5 parts (dry weight) of a carboxylic acid group-containing polymeric agglomerating agent to produce an agglomerated butadiene rubber latex having a pH value of 8.7 and a weight average particle size of 0.18 μm.

A graft polymerization was then carried out to produce the rubber graft copolymer (A-1), according to the following recipe.

| components | weight parts |
|---|---|
| agglomerated butadiene rubber latex (dry weight) | 100.0 |
| styrene | 25.0 |
| acrylonitrile | 8.3 |
| potassium oleate | 1.2 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 3.0 |
| distilled water | 200.0 |

The rubber graft copolymer latex prepared from the above components are coagulated with calcium chloride ($CaCl_2$) to recover the rubber graft copolymer (A-1) as a dry powder form which would be desired in the following preparation of graft copolymer (C). The rubber graft copolymer (A-1) has a rubber content of 75 wt % and a degree of grafting of 24%. The molecular weight of the grafted styrene-acrylonitrile copolymer is 78,000.

PREPARATION EXAMPLE I-2

Preparation of Rubber Graft Copolymer (A-2)

The butadiene rubber latex prepared in Preparation Example I-1 was used with the following recipe to conduct a graft polymerization to produce a rubber graft copolymer (A-2) with a rubber content of 71.4 wt %. The rubber graft copolymer (A-2) has a weight average particle size of 0.1 μm and a degree of grafting of 26%. The molecular weight of the styrene-acrylonitrile copolymer grafted on the rubber is 65,000.

| components | weight parts |
|---|---|
| butadiene rubber latex (0.1 μm) (dry weight) | 100.0 |
| styrene | 30.0 |

-continued

| components | weight parts |
| --- | --- |
| acrylonitrile | 10.0 |
| potassium oleate | 1.5 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 3.0 |
| distilled water | 200.0 |

PREPARATION EXAMPLE II-1

Preparation of the Acrylic copolymer (B-1)

A feed solution of raw material including a mixture of 75 wt % of styrene, 10 wt % of methyl methacrylate and 15 wt % of acrylonitrile is mixed and fed into a reactor at a rate of 12 kg/hr. Ethylene-bis-stearamide at a rate of 3.0 g/hr, benzoyl peroxide, tert-dodecyl mercaptan and a recovery solution mentioned below are also fed into the reactor. The internal temperature of the reactor is maintained at 108° C. The reactor is a continuous stirring tank reactor (CSTR) having a capacity of 45 liters. The content of toluene in the reaction solution is maintained at 15% and the conversion of monomer is maintained at 55%.

The reaction solution is delivered into a devolatilizer for the removal of volatile components, and the acrylic copolymer (B-1) desired in the present invention is obtained. On the other hand, the removed volatile components is condensed as a recovery solution by a condenser. The reaction rate of this process can be controlled by adjusting the amount of benzoyl peroxide or the amount of tert-dodecyl mercaptan. A styrene-acrylonitrile-methyl methacrylate copolymer (B-1) having a melt index of 1.2 is formed.

PREPARATION EXAMPLE II-2

Preparation of Acrylic Copolymer (B-2)

The preparation is similar to that of Preparation Example II-1, except that the raw materials include 78 wt % of styrene and 22 wt % of acrylonitrile. A styrene-acrylonitrile copolymer (B-2) having a melt index of 1.1 is formed.

PREPARATION EXAMPLE III

Preparation of Graft Copolymer (C)

A solution of raw material including 6 parts of the rubber graft copolymer (A-1) powder prepared in Preparation Example I-1, 2 parts of styrene-acrylonitrile-methyl methacrylate (B-1), 72.0 parts of styrene, 28 parts of acrylonitrile, 7 parts of ethyl benzene, 0.09 parts of tert-dodecyl mercaptan and 0.05 parts of benzoyl peroxide (initiator) is mixed and continuously fed into a first reactor at a rate of 22 l/hr. The reactor has a capacity of 44 liters. The screw-type blender provided in the reactor operates at a rate of 100 rpm and has a circulating cooling pipe. The polymerization temperature, pressure and retention time at the first reactor are 120° C., 4 kg/cm², 2 hr, respectively. The polymerization mixture in the first reactor is continuously delivered into a second reactor which structure is identical to the first reactor. When the conversion of the mixture reaches 60%, the mixture is delivered into a devolatilizer for the removal of unreacted monomers and volatile components and is then extruded and pelletized to produce the graft copolymer (C-1).

The graft copolymers (C-2), (C-3), (C-4), (C-5), (C-6) and (C-7) are prepared according to the above preparation method except that the raw materials shown in Table 2 is changed.

TABLE 2

| | | | | | | | | (weight parts) |
| --- | --- | --- | --- | --- | --- | --- | --- | --- |
| graft copolymer (C) | | (C-1) | (C-2) | (C-3) | (C-4) | (C-5) | (C-6) | (C-7) |
| rubber graft | types | (A-1) | (A-1) | (A-2) | (A-1) | (A-1) | — | (A-1) |
| copolymer (A) | weight parts | 6.0 | 6.0 | 2.0 | 6.0 | 6.0 | — | 16.0 |
| acrylic | types | (B-1) | (B-1) | (B-2) | (B-2) | — | (B-1) | (B-1) |
| copolymer (B) | weight parts | 2.0 | 2.0 | 2.0 | 2.0 | — | 2.0 | 2.0 |
| styrene | | 72.0 | 72.0 | 68.0 | 68.0 | 72.0 | 72.0 | 72.0 |
| acrylonitrile | | 28.0 | 28.0 | 28.0 | 20.0 | 28.0 | 28.0 | 28.0 |
| methylmethacrytate | | 0 | 0 | 4.0 | 0 | 0 | 0 | 0 |
| N-phenyl maleimide | | 0 | 0 | 0 | 8.0 | 0 | 0 | 0 |
| α-methyl styrene | | 0 | 0 | 0 | 4.0 | 0 | 0 | 0 |

PREPARATION EXAMPLE IV

Preparation of the Graft Copolymer (D)

| components | weight parts |
| --- | --- |
| 1,3-butadiene | 150.00 |
| potassium persulfate solution (1%) | 15.00 |
| potassium oleate | 2.00 |
| distilled water | 190.00 |
| ethylene glycol methacrylate | 0.13 |

The above components are reacted at 65° C. for 12 hours to yield a butadiene rubber latex with a conversion of 94% and having a solid content of 40% and a weight average particle size of 0.1 μm.

A carboxylic acid group-containing polymeric agglomerating agent was prepared from the following components:

| components | weight parts |
| --- | --- |
| ethyl acrylate | 90.0 |
| methacrylic acid | 10.0 |
| potassium persulfate solution (1%) | 0.5 |
| dodecyl sodium sulfate solution (10%) | 0.5 |
| n-dodecyl mercaptan | 1.0 |
| distilled water | 200.0 |

The above components are reacted at 75° C. for 5 hours to yield a carboxylic acid group-containing polymeric agglomerating agent with a conversion of 95% and a pH value of 6.0.

100 parts (dry weight) of the butadiene rubber latex are then agglomerated with 3 parts (dry weight) of a carboxylic acid group-containing polymeric agglomerating agent to produce an agglomerated rubber latex having a pH value of 8.5 and a weight average particle size of 0.31 µm.

A graft polymerization was then carried out to produce the graft copolymer (D), according to the following recipe.

| components | weight parts |
| --- | --- |
| agglomerated butadiene rubber latex (dry weight) | 100.0 |
| styrene | 38.8 |
| acrylonitrile | 15.0 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 3.0 |
| distilled water | 200.0 |

The rubber graft copolymer latex prepared from the above components is coagulated with calcium chloride ($CaCl_2$) and dried, such that the moisture content is below 2%. The rubber graft copolymer (D) has a rubber content of 65 wt % and a degree of grafting of 38%. The molecular weight of the grafted styrene-acrylonitrile copolymer is 82,000.

PREPARATION EXAMPLE V-1

Preparation of Styrene-acrylonitrile Copolymer (E-1)

A feed solution of raw material including a mixture of 76 wt % of styrene and 24 wt % of acrylonitrile is mixed and fed into a reactor at a rate of 12 kg/hr. Ethylene-bis-stearamide at a rate of 3.0 g/hr, benzoyl peroxide, tert-dodecyl mercaptan and a recovered solution mentioned below which is formed by devolatilizing and condensing the reaction solution are also fed into the reactor. The reactor is a continuous stirring tank reactor having a temperature maintained at 108° C. and a capacity of 45 liters. The amount of toluene in the reaction solution is maintained at 15%, and the conversion of monomer is maintained at 55%.

The reaction solution is delivered into a devolatilizer for the removal of volatile components and the copolymer (E-1) pellet is obtained. On the other hand, the removed volatile components are condensed as a recovery solution by a condenser. The reaction rate of this process can be controlled by adjusting the amount of benzoyl peroxide or the amount of tert-dodecyl mercaptan. A styrene-acrylonitrile copolymer (E-1) having a melt index of 3.0 is formed.

PREPARATION EXAMPLE V-2

Preparation of Styrene-acrylonitrile-N-phenylmaleimide Copolymer (E-2)

A feed solution of raw material including 68 wt % of styrene, 22 wt % of acrylonitrile and 10 wt % of N-phenyl maleimide is mixed and fed into a reactor at a rate of 12 kg/hr. Ethylene-bis-stearamide at a rate of 3.0 g/hr, benzoyl peroxide, tert-dodecyl mercaptan and a recovery solution mentioned below which is formed by devolatilizing and condensing the reaction solution are also fed into the reactor. The internal temperature of the reactor is maintained at 108° C. The reactor is a continuous stirring tank reactor having a capacity of 45 liters. The amount of toluene in the reaction solution is maintained at 15% and the conversion of monomer is maintained at 55%.

The reaction solution is delivered into a devolatilizer for the removal of volatile components and the styrene-acrylonitrile-N-phenylmaleimide copolymer (E-2) pellet is obtained. On the other hand, the removed volatile components are condensed as a recovery solution by a condenser for repeated use with the raw material. The reaction rate of this process can be controlled by adjusting the amount of benzoyl peroxide or the amount of tert-dodecyl mercaptan. A styrene-acrylonitrile-N-phenylmaleimide copolymer (E-2) having a melt index of 1.5 is formed.

Tests of physical properties for the following Examples and Comparative Examples are classified into two groups. One group is directed to the physical properties without metal-plating, including gloss variance and Izod impact strength. The other group is directed to the physical properties of metal plated test pieces, including the appearance of the metal-plated product, heat cycle property and the adhesion strength of the metal-plated layer. The test standards of the above physical properties are as follows:

*gloss variance (Gardner 60°, incidence angle) is tested according to ASTM D-523. The unit adapted is %. The test piece therefor is an injection molded product with a length of 300 mm, a width of 25 mm and a thickness of 3 mm. The injection gate (fan shaped) is positioned 15 mm away from one end of the test piece.

(a) gloss variance between different sites: the gloss at two different sites of 5 cm and 25 cm away from the gate are tested respectively along a viewing direction perpendicular to the test piece. The smaller the difference, the smaller will be the gloss variance.

(b) gloss variance at the same site from different viewing directions: the gloss at a site 25 cm away from the gate is tested along the viewing directions perpendicular and parallel to the test piece, respectively. The smaller the difference, the smaller will be the gloss variance.

*Izod impact strength (IZOD) is tested according to ASTM D-256. The unit adapted is kg.cm/cm.

*Appearance of the metal-plated product is tested as follows:

A 101.6 mm×76.5 mm×3.2 mm test piece is formed from resin materials by an injection machine and is then metal-plated. The appearance of the metal-plated test piece is inspected. "X" indicates that pin holes or fish eyes are found on the metal-plated test piece. "O" indicates that the surface of the metal-plated test piece is smooth and no pin hole was found.

*The heat cycle property is tested as follows:

The metal-plated test piece is kept at room temperature for 15 minutes, then at −40° C. for 1 hour, then at room temperature again for another 15 minutes and finally at 80° C. for 1 hour. This is defined as one cold/hot heat cycle. Ten metal-plated test pieces were kept under the above conditions for one heat cycle, three heat cycles and five heat cycles. The test pieces were inspected to see whether cracks or blisters occurred on the metal-plated layer. If the test piece has cracks or a blisters found thereon, the test piece does not pass the test. If the test piece is smooth and has no cracks, then the test piece has passed the test. Here the passed/tested=6/10 means ten pieces have been tested with which 6 of them have passed the heat cycle test.

*Adhesion strength of the metal-plated layer is tested according to ASTM B-533. The unit adapted is kg/cm.

The metal-plated test piece is prepared according to the following procedure:

(1) degreasing:

The test piece is kept in a solution which is a mixture of sodium hydroxide, sodium phosphate and sodium carbonate under 50° C. for 5 minutes;

(2) etching:

The test piece is kept in a solution which is a mixture of chromic acid and sulfuric acid under 68° C. for 7 minutes;

(3) neutralizing:

The test piece is kept in a hydrochloride solution under 25° C. for 2 minutes;

(4) sensitiving & activating:

The test piece is kept in a solution which is a mixture of palladium chloride, tin chloride and hydrochloride under 30° C. for 4 minutes;

(5) accelerating:

The test piece is kept in sulfuric acid solution under 40° C. for 1 minute;

(6) chemical Ni plating:

The test piece is kept in a solution which is a mixture of nickel sulfate, oxalic acid, sodium dihydrogen phosphate and boric acid under 35° C. for 12 minutes.

(7) Cu plating:

The test piece is kept in a solution of cupric sulfate under 25° C. for 30 minutes. The film has a thickness of 10 μm.

(8) Ni plating:

The test piece is kept in a solution of nickel sulfate under 55° C. for 30 minutes. The film has a thickness of 10 μm.

(9) Cr plating:

The test piece is kept in a solution of chromic acid under 50° C. for 2 minutes. The film has a thickness of 0.15 μm.

EXAMPLE 1

50 wt % of graft copolymer (C-1) (prepared in Preparation Example III-1), 31 wt % of graft copolymer (D) (prepared in Preparation Example IV) and 19 wt % of styrene-acrylonitrile copolymer (E-1) (prepared in Preparation Example V-1) were mixed with 2.0 parts by weight of lubricant and 0.05 parts by weight of silicon oil (poly dimethyl siloxane). The mixture is then extruded with a Werner & Pfleiderer ZSK 35 extruder at 220° C. and is pelletized to produce a styrenic resin composition with a rubber content of 17 wt %. The resin composition is then injection molded (the injection machine used being produced by Cheng-Shong Company under serial No. SM-90) at 220° C. and is tested for its physical properties. The conditions for the injection molding are as follows:

injection temperature: 220° C.

injection pressure: 1050 kg/cm² (75%)

injection rate: 72 cm³/sec (80%)

test piece size: 101.6 mm×76.5 mm×3.2 mm

The test piece was metal-plated according to the above metalplating procedure. The metal-plated test piece was then inspected for the appearance thereof and tested for its performance over the heat cycle and the adhesion strength thereof. Another test piece was injection molded under the same injection conditions and was tested for the Izod impact strength and the gloss thereof. The results are listed in Table 3.

EXAMPLE 2

The preparation and testing of the styrenic resin composition were the same as Example 1 except that components shown in table 3 were changed. The physical properties and the metal-plating properties are listed in Table 3.

EXAMPLE 3

The preparation and testing of the styrenic resin composition were the same as Example 1 except that components shown in table 3 were changed. The physical properties and the metal-plating properties are listed in Table 3.

EXAMPLE 4

The preparation and testing of the styrenic resin composition were the same as Example 1 except that components shown in table 3 were changed. The physical properties and the metal-plating properties are listed in Table 3.

EXAMPLE 5

The preparation and testing of the styrenic resin composition were the same as Example 1 except that components shown in table 3 were changed. The physical properties and the metal-plating properties are listed in Table 3.

EXAMPLE 6

The preparation and testing of the styrenic resin composition were the same as Example 1 except that components shown in table 3 were changed. The physical properties and the metal-plating properties are listed in Table 3.

COMPARATIVE EXAMPLE 1

The procedure of Example 1 was repeated except that the resin composition did not contain graft copolymer (C). The test pieces produced therefrom were also tested for the physical properties and the metalplating properties thereof. The results are listed in Table 3.

COMPARATIVE EXAMPLE 2

The procedure of Example 1 was repeated except that the graft copolymer (C) was substituted by the graft copolymer (C-5) shown in Table 2, i.e., the graft copolymer did not contain acrylic copolymer (B). The test pieces produced therefrom were also tested for the physical properties and the metalplating properties thereof. The results are listed in Table 3.

COMPARATIVE EXAMPLE 3

The procedure of Example 1 was repeated except that the graft copolymer (C) was substituted by the graft copolymer (C-6), i.e., the graft copolymer did not contain rubber graft copolymer (A). The molded test pieces were also tested for the physical properties and the metalplating properties thereof. The results are listed in Table 3.

COMPARATIVE EXAMPLE 4

The procedure of Example 1 was repeated except that the content of graft copolymer (C) was 2 wt %. The molded test pieces were also tested for the physical properties and the metal-plating properties thereof. The results are also listed in Table 3.

COMPARATIVE EXAMPLE 5

The procedure of Example 1 was repeated except that the graft copolymer (C) was substituted by the graft copolymer (C-7) and that the content of the rubber graft copolymer (A) was 16 wt %. The molded test pieces were also tested in a similar way. The results are listed in Table 3.

COMPARATIVE EXAMPLE 6

The preparation and testing of the styrenic resin were identical to those of Comparative Example 1 except that the injection pressure was 420 kg/cm²(30%) and the injection rate was 31.5 cm³/sec (35%), which injection conditions were less than that in Comparative Example 1.

The adhesion strength and the heat cycle properties were a little improved under the above injection conditions, but it resulted in lower production efficiency.

It should be noted that the above Examples are listed for illustrating the preferred embodiment to help practice the present invention and are not to be interpreted so as to limit the scope of the present invention.

With this invention thus explained, it is apparent that numerous modifications and variations can be made without

TABLE 3

| Example No. | | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|---|
| Components | graft copolymer (C) wt % | (C-1) 50.0 | (C-1) 82.2 | (C-1) 20.0 | (C-2) 50.0 | (C-3) 76.4 | (C-4) 50.0 | — | (C-5) 50.0 | (C-6) 50.0 | (C-3) 2.0 | (C-7) 50.0 |
| | graft copolymer (D) wt % | 21.0 | 17.8 | 24.1 | 21.3 | 23.6 | 21.3 | 26.1 | 20.9 | 26.1 | 26.0 | 14.3 |
| | copolymer (E) wt % | (E-1) 29.0 | — | (E-1) 55.9 | (E-1) 28.7 | — | (E-2) 28.7 | (E-1) 73.9 | (E-1) 19.0 | (E-1) 16.0 | (E-1) 72.0 | (E-1) 35.7 |
| | total rubber content (%) in the resin composition | 17.0 | 17.0 | 17.0 | 17.0 | 17.0 | 17.0 | 17.0 | 17.0 | 17.0 | 17.0 | 17.0 |
| physical properties | gloss variance % (a) 5 cm/25 cm | 2.2 | 1.8 | 2.9 | 1.9 | 1.6 | 2.4 | 8.6 | 7.6 | 8.8 | 4.2 | 2.5 |
| | (b) vertical/parallel | 1.0 | 0.7 | 1.6 | #.2 | a.8 | 1.1 | 6.8 | 5.2 | 6.4 | 2.8 | 1.6 |
| | Izod impact strength (kg.cm/cm) | 28.0 | 29.5 | 27.4 | 28.5 | 27.5 | 27.2 | 25.1 | 25.5 | 25.3 | 24.8 | 26.8 |
| metal-plating characteristics | appearance of metal-plated molded product | ○ | ○ | ○ | ○ | ○ | ○ | ○ | × | ○ | ○ | × |
| | performance over  1 cycle | 10/10 | 10/10 | 10/10 | 10/10 | 10/10 | 10/10 | 9/10 | — | 9/10 | 10/10 | — |
| | heat cycle  3 cycles | 10/10 | 10/10 | 10/10 | 9/10 | 10/10 | 5/10 | — | 6/10 | 5/10 | — | |
| | (passed/tested)  5 cycles | 10/10 | 10/10 | 8/10 | 8/10 | 9/10 | 2/10 | — | 2/10 | 2/10 | — | |
| | adhesion strength of the metal-plated layer | 2.8 | 2.9 | 2.5 | 2.7 | 2.4 | 2.7 | 1.8 | 2.0 | 1.8 | 1.8 | 2.4 |

It was noted from the test results of Comparative Examples 1 and 4 that, when the graft copolymer (C) in the resin composition of the present invention is in an amount less than 5 wt %, the impact strength is poor, the improvement in the gloss variance is not significant, and the adhesion strength of the metal-plated layer is poor. The test results of Comparative Example 2 show that, when the graft copolymer (C) does not contain the acrylic polymer (B), the improvement in the gloss variance of the resin composition and the adhesion strength of metal-plated layer are limited and the appearance of the metal-plated product is found to have fish eyes. It can be demonstrated in Comparative Example 3 that if the graft copolymer (C) did not contain a rubber graft copolymer (A), the improvement in the impact strength of the resin composition is small, the gloss variance of the composition is significant, the adhesion strength and the performance over the heat cycle are also poor. The results of Comparative Example 5 indicate that, when the content of rubber graft copolymer (A) in the graft copolymer is greater than 10 wt %, since the dispersion of the rubber graft copolymer (A) in the resin is not good, the appearance of the molded product and the metal-plated product of the resin composition are not satisfactory. Further, the results of Comparative Example 6 indicate that the reduction of injection rate and injection pressure slightly improve the metal-plating characteristics of the composition of Comparative Example 1. However, such modifications in the injection conditions result in reduction of the production rate, and are thus not economical.

Referring back to Examples 1 to 6, by means of limiting the components and the contents thereof, the resin composition of the present invention is provided with good impact strength and small gloss variance. In addition, when the resin composition is used for a metal-plated molded product, the metalplating characteristics thereof are improved.

departing from the scope and spirit of this invention. It is therefore intended that this invention be limited only as indicated in the appended claims.

I claim:

1. A styrenic resin composition comprising:
   (1) 5 to 90 weight percent of a graft copolymer (C) prepared by bulk or solution polymerization of 100 parts by weight of monomers including 80 to 45 parts by weight of vinyl aromatic monomers, 15 to 50 parts by weight of vinyl cyanide monomers, and 0 to 40 parts by weight of copolymerizable monomers, in the presence of 0.1 to 10 parts by weight of a rubber graft copolymer (A) having a weight average particle size of 0.05 to 0.8 μm and 0.1 to 10 parts by weight of an acrylic copolymer (B) which is resinous polymer and which is rigid and which is soluble in said monomers, wherein, the acrylic copolymer (B) is prepared from 10 to 100 wt % of at least one monomer selected from (meth)acrylate monomers and acrylonitrile monomer, 0 to 80 wt % of vinyl aromatic monomers and 0 to 30 wt % of copolymerizable monomers;
   (2) 95 to 10 weight percent of a graft copolymer (D) prepared by emulsion polymerization of 50 to 15 parts by weight of a mixture of 45 to 80 parts by weight of vinyl aromatic monomers, 15 to 50 parts by weight of vinyl cyanide monomers and, optionally, 0 to 40 parts by weight of copolymerization monomers, in the presence of 50 to 85 parts by weight of a butadienic rubber having a weight average particle size of 0.05 to 0.8 μm; and
   (3) 0 to 80 weight percent of a copolymer (E) prepared by polymerization of 80 to 50 parts by weight of vinyl aromatic monomers, 20 to 50 parts by weight of vinyl cyanide monomers and, optionally, 0 to 40 parts by weight of copolymerizable monomers.

2. The styrenic resin composition according to claim 1, wherein said rubber graft copolymer (A) is prepared by emulsion polymerization.

3. The styrenic resin composition according to claim 1, wherein the degree of grafting of said rubber graft copolymer (A) is 10 to 40% and the molecular weight of the grafted rigid copolymer of said rubber graft copolymer (A) is between 40.000 to 120.000.

* * * * *